(12) United States Patent
Khan

(10) Patent No.: US 7,460,524 B2
(45) Date of Patent: Dec. 2, 2008

(54) METHOD OF FRAME AGGREGATION

(75) Inventor: Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 775 days.

(21) Appl. No.: 10/730,149

(22) Filed: Dec. 7, 2003

(65) Prior Publication Data

US 2005/0122960 A1   Jun. 9, 2005

(51) Int. Cl.
   *H04L 12/66* (2006.01)
(52) U.S. Cl. .................. 370/353; 370/229; 370/230; 370/230.1; 370/231; 370/352; 370/354; 370/355; 370/356; 370/335; 370/342; 370/344; 370/329; 370/465; 370/466
(58) Field of Classification Search ................. None
   See application file for complete search history.

(56) References Cited

U.S. PATENT DOCUMENTS

| | | | |
|---|---|---|---|
| 6,775,254 B1 * | 8/2004 | Willenegger et al. | 370/329 |
| 2002/0016852 A1 * | 2/2002 | Nishihara | 709/236 |
| 2003/0137975 A1 * | 7/2003 | Song et al. | 370/353 |
| 2003/0169769 A1 | 9/2003 | Ho et al. | 370/473 |
| 2004/0240401 A1 * | 12/2004 | Willenegger et al. | 370/294 |
| 2005/0015703 A1 * | 1/2005 | Terry et al. | 714/776 |

FOREIGN PATENT DOCUMENTS

EP   1 069 711   1/2001

OTHER PUBLICATIONS

Paul Lettieri et al, "Adaptive Frame Length Control for Improving Wireless Link Throughput, Range, and Energy Efficiency," IEEE *Infocom '98, 17th Annual Joint Conference of the IEEE Computer and Communications Society*, San Francisco, CA, vol. 2, (Mar. 29, 1998), pp. 564-571.

Sanjiv Nanda et al, "Adaptation Techniques in Wireless Packet Data Services," *IEEE Communications Magazine, IEEE Service Center*, Piscataway, NJ, vol. 38, No. 1, (Jan. 2000), pp. 54-64.

Daji Qiao et al, "Goodput Analysis and Link Adaptation for IEEE 802.11a Wireless LANs," *IEEE Transactions on Mobile Computing, IEEE Service Center*, Piscataway, NJ, vol. 1, No. 4, (Oct. 2002), pp. 278-292.

J. Michael Meehan et al, "Data Link Frame Aggregation Protocol," *Proceedings of the ISCA*, (Apr. 4, 2002), pp. 1-4.

(Continued)

*Primary Examiner*—Raj K Jain

(57) ABSTRACT

A method of the communication includes communicating at least one physical layer frame. The physical layer frame is formed by dynamically varying an aggregate packet size in response to a condition of a channel used for communicating voice and/or data. Here, the step of dynamically varying aggregate packet size may involve modifying a number of content frames to form the physical layer frame. The physical layer frame may correspond with a payload having at least two content frames and at least one IP header. Each content frame may include a voice frame and/or a data frame.

3 Claims, 6 Drawing Sheets

OTHER PUBLICATIONS

Tom Hiller et al, "Good Enough header COmpression (GEHCO)," *IETF*, (Aug. 2000), pp. 1-16.

Oliver T.W. Yu, "End-to-End Adaptive QoS Provisioning Over GPRS Wireless Mobile Network," *Mobile Networks and Applications Archive*, vol. 8, (Jun. 2003), pp. 255-267.

Lin Wang et al, "Design Issues of Media Access Control (MAC) Protocol for Multi-media Trafic Over DS-CDMA Systems," *European Wireless*, (Feb. 2002), pp. 1-8.

Jean Lorchat et al, "Energy Saving in IEEE 802.11 Communications Using Frame Aggregation," *IEEE Global Telecommunications Conference*, NY, NY, vol. 7 of 7, (Dec. 1, 2003), pp. 1296-1300.

Cesar Heyaime-Duverge et al, "TraPS: Traffic-Based Packet Scheduling for the cdma2000 Reverse Link," *14th IEEE Proceedings*, Piscataway, NJ, vol. 2, (Sep. 7, 2003), pp. 2322-2327.

F. Khan, "A Novel Technique for High Speed Uplink Data Transmission in 3G Systems," *3G Mobile Communication Technologies, 4th International Conference*, (Jun. 25, 2003), pp. 328-332.

European Search Report for Application 04257207.3, Dated May 11, 2005.

P. Letieri, et al, "Adaptive Frame Length Control for Improving Wireless Link Throughput, Range, and Energy Efficiency," *IEEE Infocom '98*, (Mar. 29-Apr. 2, 1998), vol. 2, pp. 564-571.

S. Nanda, et al, "Adaptation Techniques in Wireless Packet Data Services," *IEEE Service Center*, Piscataway, NJ, vol. 38, No. 1, (Jan. 2000), pp. 54-64.

D. Qiao, et al, "Goodput Analysis and Link Adaptation for IEEE 802.11a Wireless LANs," IEEE Transactions on Mobile Computing, vol. 1, No. 4, (Oct. 2002), pp. 278-292.

N. Meehan, et al, "Data Link Frame Aggregation Protocol," *Proceedings of the ISCA*, (Apr. 4, 2002), Paragraph 2. "Data Link Aggregation."

T. Hiller, et al, "Good Enough Header Compression (GEHCO)," *IETF*, (Aug. 2000), Paragraph 3. "Introduction," Paragraph 5. "Transparent Compression and Spectral Efficiency."

European Search Report.

\* cited by examiner

METHOD OF FRAME AGGREGATION

BACKGROUND OF THE INVENTION

1. Field of the Invention

The present invention relates to telecommunications, and more particularly, to wireless and wireline communications.

2. Description of the Related Art

Wireless communications systems provide wireless service to a number of wireless or mobile units situated within a geographic region. The geographic region supported by a wireless communications system is divided into spatially distinct areas commonly referred to as "cells." Each cell, ideally, may be represented by a hexagon in a honeycomb pattern. In practice, however, each cell may have an irregular shape, depending on various factors including the topography of the terrain surrounding the cell. Moreover, each cell is further broken into two or more sectors. Each cell is commonly divided into three sectors, each having a range of 120 degrees, for example.

A conventional cellular system comprises a number of cell sites or base stations geographically distributed to support the transmission and reception of communication signals to and from the wireless or mobile units. Each cell site handles voice communications within a cell. Moreover, the overall coverage area for the cellular system may be defined by the union of cells for all of the cell sites, where the coverage areas for nearby cell sites overlap to ensure, where possible, contiguous communication coverage within the outer boundaries of the system's coverage area.

Each base station comprises at least one radio and at least one antenna for communicating with the wireless units in that cell. Moreover, each base station also comprises transmission equipment for communicating with a Mobile Switching Center ("MSC"). A mobile switching center is responsible for, among other things, establishing and maintaining calls between the wireless units, between a wireless unit and a wireline unit through a public switched telephone network ("PSTN"), as well as between a wireless unit and a packet data network ("PDN"), such as the Internet. A base station controller ("BSC") administers the radio resources for one or more base stations and relays this information to the MSC.

When active, a wireless unit receives signals from at least one base station over a forward link or downlink and transmits signals to at least one base station over a reverse link or uplink. Several approaches have been developed for defining links or channels in a cellular communication system, including time-division multiple access ("TDMA"), orthogonal-frequency division multiple access ("OFDMA") and code-division multiple access ("CDMA"), for example.

In TDMA communication systems, the radio spectrum is divided into time slots. Each time slow allows only one user to transmit and/or receive. Thusly, TDMA requires precise timing between the transmitter and receiver so that each user may transmit their information during their allocated time.

In a CDMA scheme, each wireless channel is distinguished by a distinct channelization code (e.g., spreading code, spread spectrum code or Walsh code). Each distinct channelization code is used to encode different information streams. These information streams may then be modulated at one or more different carrier frequencies for simultaneous transmission. A receiver may recover a particular stream from a received signal using the appropriate channelization code to decode the received signal.

In OFDMA systems, a carrier signal may be defined by a number (e.g., 1024) of sub-carriers or tones transmitted using a set of mathematically time orthogonal continuous waveforms. Each wireless channel may be distinguished by a distinct channelization tone. By employing orthogonal continuous waveforms, the transmission and/or reception of the tones may be achieved, as their orthogonality prevents them from interfering with one another.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Here, each active wireless unit generally requires the assignment of a dedicated link on the downlink, as well as a dedicated link on the uplink.

With respect to real-time and/or circuit switched services, such as voice, video and wireless gaming applications, for example, conventional cellular communication systems employ dedicated channels or links between a wireless unit(s) and a base station. Voice communications and other real-time and/or circuit switched services have to date been viewed as delay-intolerant by nature. Consequently, wireless units in wireless cellular communication systems transmit and receive signals over one or more dedicated links. Here, each active wireless unit generally requires the assignment of a dedicated link on the downlink as well as a dedicated link on the uplink.

The explosive growth of the Internet and private Intranets has resulted in increasing infrastructure supporting Internet Protocol ("IP") transmission and reception. This explosion has led the wireless telecommunication equipment suppliers to reexamine assumptions regarding voice and data transmission. Employing an IP scheme for wireless telephony may simplify equipment designs, given the ease in which data and voice may flow interchangeably. Consequently, there is a move afoot to develop IP based wireless equipment capable of voice and data transmission/reception supportive of wireless cellular standards, such as 3 G, as well as other wireless standards, including those involving Wireless Fidelity (e.g., WiFi or 802.x).

The Internet is a packet-switched based architecture, where data transmitted over the network may be segmented and conveyed in packets. Unlike circuit-switched networks, such as the public switched telephone network ("PSTN"), a packet-switched network is connectionless—in other words, the dedicated end-to-end path of the packet-switched network is not required for each transmission. Rather, each router may calculate a preferred routing for a packet given current traffic patterns, and may send the packet to the next router. Thus, even two packets from the same message may not travel the same physical path through the network. This method is a type of layer three forwarding known as dynamic routing.

An IP packet is comprised of a packet data portion and an IP header. The IP header is comprised of a variety of header fields, including a source address and a destination address. The IP header, and therefore those fields which comprise the IP header, represent a transmission overhead since header bits are transported along with the actual data bits for each packet. Additionally, since IP routers forward IP packets based on each packets destination address, each IP packet header must be parsed at a controlling microprocessor in each router through which a packet is forwarded. The destination address associated with each respective packet is accessed by the microprocessor and a forwarding lookup table is utilized to forward each packet to a next router. Despite advances associated with processor speeds, the performance of forwarding algorithms and functions at each IP router utilizes precious router processing capacity and consequently limits the forwarding capacity of the routers.

In developing an IP based wireless equipment using a packet switching scheme capable of voice and data transmission/reception, various considerations require examination. Performing voice over an IP based system (e.g., VoIP) is, to date, a relatively low data rate application. To reduce the protocol and physical layer overhead in a VoIP design, the IP packets may be aggregated into relatively larger packets and transmitted using a single medium access control/physical layer frame (e.g., "MAC/PHY" frame). These IP packets may be aggregated over a fixed duration—e.g., 100 ms—of voice samples and packaged into a single physical layer frame.

Referring to FIG. 1, an example of a known voice frame aggregation scheme of having a fixed duration is shown. Here, the voice frame is aggregated over 40 ms, for example. From the depicted voice frame aggregation scheme, it is assumed that two frames each containing 20 ms voice samples, for example, are packaged together. One set of header information may be added to the aggregated frame and transmitted in a single physical layer frame. The header information may consist of one or more of the following: Real Time Transport ("RTP"); User Datagram Protocol ("UDP") header; Internet Protocol ("IP") header; Point-to-Point Protocol ("PPP") header; Radio Link Protocol ("RLP") header; Medium Access Control ("MAC") header; Cyclic Redundancy Check ("CRC"); and physical layer tail bits used in channel coding.

Various problems, however, may arise when employing a voice frame aggregation of a fixed duration. Packet delay jitter, for example, may arise in a voice frame aggregation scheme of fixed duration if the data rate of the channel changes (e.g., the channel conditions vary between a wireless unit and an associated base station). By logical extension, as channel conditions vary, so to do available data rates. Longer packet transmission times may, for example, give rise to packet delay jitter when the channel data rate decreases. Here, the channel data rate may also decrease for reasons including variable conditions in the wireless channel. Larger delays may also be anticipated for the first aggregated packet generated at the beginning of an ON period for a wireless unit. This may transpire because the resources have been released during the wireless unit's OFF period and additional access delay may also be applied to the packet itself. Finally, voice frame aggregation of a fixed duration may be inefficient in its use of channel bandwidth.

Consequently, a demand exists for a method of frame aggregation that reduces packet delay jitter and the delay for the first aggregate pack, as well as increases the efficient use of the channel bandwidth.

SUMMARY OF THE INVENTION

The present invention provides a method of frame aggregation that reduces packet delay jitter and the delay for the first aggregate packet, as well as increases the efficient use of the channel bandwidth. More particularly, the method of the present invention provides a number of techniques for communicating at least one physical layer frames. For the purposes of the present disclosure, the term communicating corresponds with the transmission and reception of packetized data, including physical layer frames, for example, formed thereform.

In an exemplary embodiment, a method of the present invention includes the step of communicating at least one physical layer frame. The physical layer frame is formed by dynamically varying an aggregate packet size in response to a condition of a channel used for communicating voice and/or data. Here, the step of dynamically varying aggregate packet size may involve modifying a number of content frames to form the physical layer frame. The physical layer frame may correspond with a payload having at least two content frames and at least one IP header. Each content frame may include a voice frame and/or a data frame.

In another exemplary embodiment, a method of the present invention includes the step of communicating at least one flag in a physical layer frame formed by an aggregating a number of content frames, each of which may comprise a voice and/or data frame. Here, this step of communicating may be performed if switching between an active period(s) and an inactive period(s). At the onset of the active period, active period, an initiation signal(s) may be communicated corresponding with the period. In turn, a scheduling grant(s) may be communicated in response to the communicated initiation signal. Here, the flag may indicate an end to the active period and a beginning of the inactive period. Consequently, the active period may correspond with communicating over an uplink.

In yet another exemplary embodiment, a method of the present invention includes the step of communicating at least one physical layer frame formed by varying an aggregate packet size. This step may be performed if switching between an active period(s) and an inactive period(s). Moreover, the step of varying an aggregate packet size may include modifying a number of content frames to form the physical layer frame(s), wherein each content frame comprises a voice frame and/or data frame. The step of switching may also correspond with switching from about an offset of the inactive period to about an onset of the active period. The communicated physical layer flame at the onset of the active period may be formed in response to the communication of scheduling grant(s).

In yet another exemplary embodiment, a method of the present invention includes the step of communicating a plurality of physical layer frames. Here, each physical layer frame may be formed by varying a packet aggregation duration m which a number of content frames are aggregated in an active period, wherein each content frame may include a voice frame and/or a data frame. The packet aggregation duration may be varied by modifying an arrival time of each physical layer frame. In one example, at least three of the physical layer frames communicated in the packet aggregation duration of an active period are spaced apart in about equal periodic intervals. The active period corresponds with communicating over an uplink and/or a downlink.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method of frame aggregation that reduces packet delay jitter and the delay for the first aggregate packet, as well as increases the efficient use of the channel bandwidth. More particularly, the method of the present invention provides a number of techniques for communicating at least one physical layer frames. For the purposes of the present disclosure, the term communicating corresponds with the transmission and reception of information, signals and packetized data, for example, including physical layer frames, formed therefrom.

Figure 1:
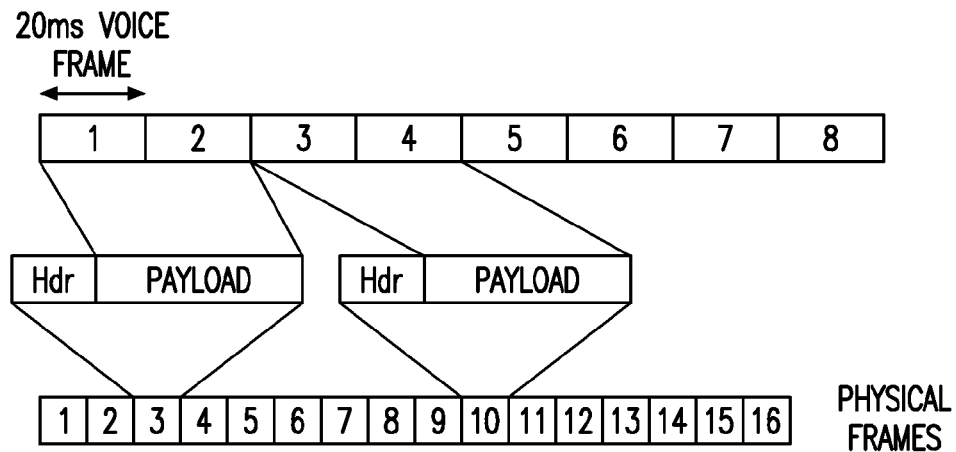
FIG. 1 depicts a known voice frame aggregation scheme.
Figure 2:
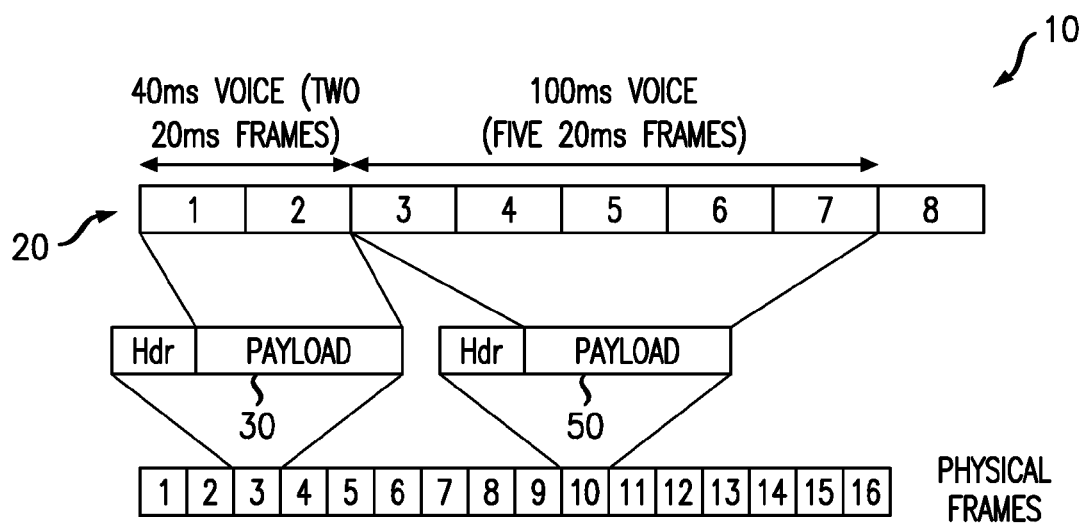
FIG. 2 depicts an aspect of an embodiment of the present invention.
Figure 3:
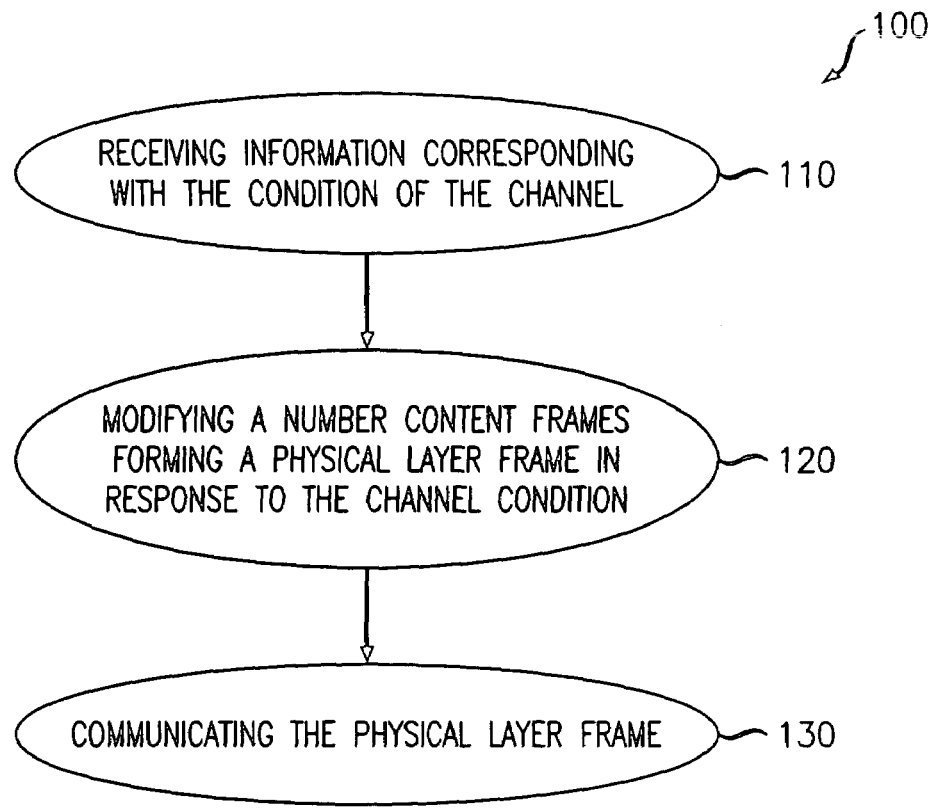
FIG. 3 depicts a flow chart according to the embodiment of FIG. 2.

Referring to FIGS. 2 and 3, aspects of an embodiment of the present invention are illustrated. FIG. 2 depicts an exemplary configuration 10 of a variable packet size aggregation technique. More particularly, this technique reduces the likelihood of retransmission and therefore delay by considering the channel quality and system load, for example. As the channel quality varies, so too does the available data rate, particularly given the limitations associated with shared resource applications utilizing a shared channel slot, for example.

Referring to FIG. 2, a number of content frames 20 are created. Each content frame 20 has a 20 ms frame size. By way of the present embodiment, a series of payloads 30 are formed from an independent number of content frames. As shown, one of payloads 30 comprises two content frames, while the other payloads 50 comprise five content frames. Once the payloads are formed from the content frames, a header is added. Thereafter, a physical layer frame may be created from each payload and header. It one example, the header and payload are intended for an Internet protocol ("IP") based systems.

Referring to FIG. 3, a flow chart 100 is shown for depicting a method of varying packet size aggregation. Here, the conditions of the channel are first determined. This may be realized by various techniques, including transmitting and receiving information corresponding with the condition of a channel for communicating voice and/or data (step 110). Thusly, the problems encountered in the prior art may be solved by allowing packet aggregation over variable length duration as shown in FIGS. 2 and 3. In this example, first packet may be aggregated over 40 ms, while the second packet is aggregated over 100 ms.

Once the channel condition is determined, the method calls for forming a physical layer frame (step 120). The forming of physical layer frame, here, is realized by modifying a number content frames forming the physical layer frame. The modification of the number content frames may be performed in response to the channel condition information, as well as the system load, for example. More particularly, an aggregate packet size forming the payload to be used in forming the physical layer frame is dynamically varied. For the purposes of the present disclosure, a content frame is a voice frame and/or a data frame created at the source of the voice and/or data. As a result of this modification step, the formation of the physical layer frame dynamically varies with the condition of the channel.

Subsequently, the method provides for communicating the formed physical lawyer frame (step 130). This step of communicating may be performed over an uplink in wireless communication. Furthermore, the term communication here includes transmitting the physical layer frame(s) as well as receiving the physical layer frame(s) on the uplink.

In one example of the present embodiment, the method includes the step of communicating at least one physical layer frame. The physical layer frame is formed by dynamically varying an aggregate packet size in response to a condition of a channel used for communicating voice and/or data. Here, the step of dynamically varying aggregate packet size may involve modifying a number of content frames to form the physical layer frame. The physical layer frame may correspond with a payload having at least two content frames and at least one IP header. Each content frame may include a voice frame and/or a data frame.

Figure 4:
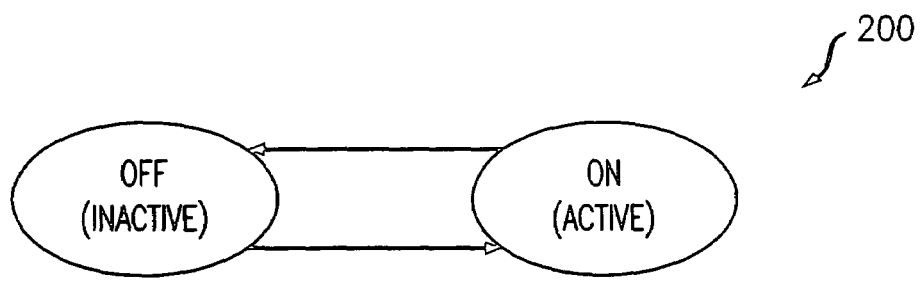
FIG. 4 depicts an aspect of embodiments of the present invention.

Referring to FIG. 4, an aspect of several embodiments of the present invention is depicted. Here, an ON-OFF source model 200 is illustrated. Generally, a voice source may switch between an active period (e.g., talk spurt) and an inactive period (e.g., silence), as shown in FIG. 4. To make efficient use of the channel bandwidth, resources may be released during the OFF (e.g., inactive or silent) period. Therefore, if a first packet at the beginning of a talk spurt should be generated, it may also go through some additional delay to access to the system. This delay might result in larger delay for the first packet from the talk spurt compared to the other packets. It should be noted that if a voice source is in an active period (e.g., talk spurt), it might continuously generates voice frames. As a result, resources may not be released during the active period (e.g., talk spurt). Therefore, the delay seen by the remaining packets forming another physical layer frame may be smaller compared to the first packet in the talk spurt.

Figure 5:
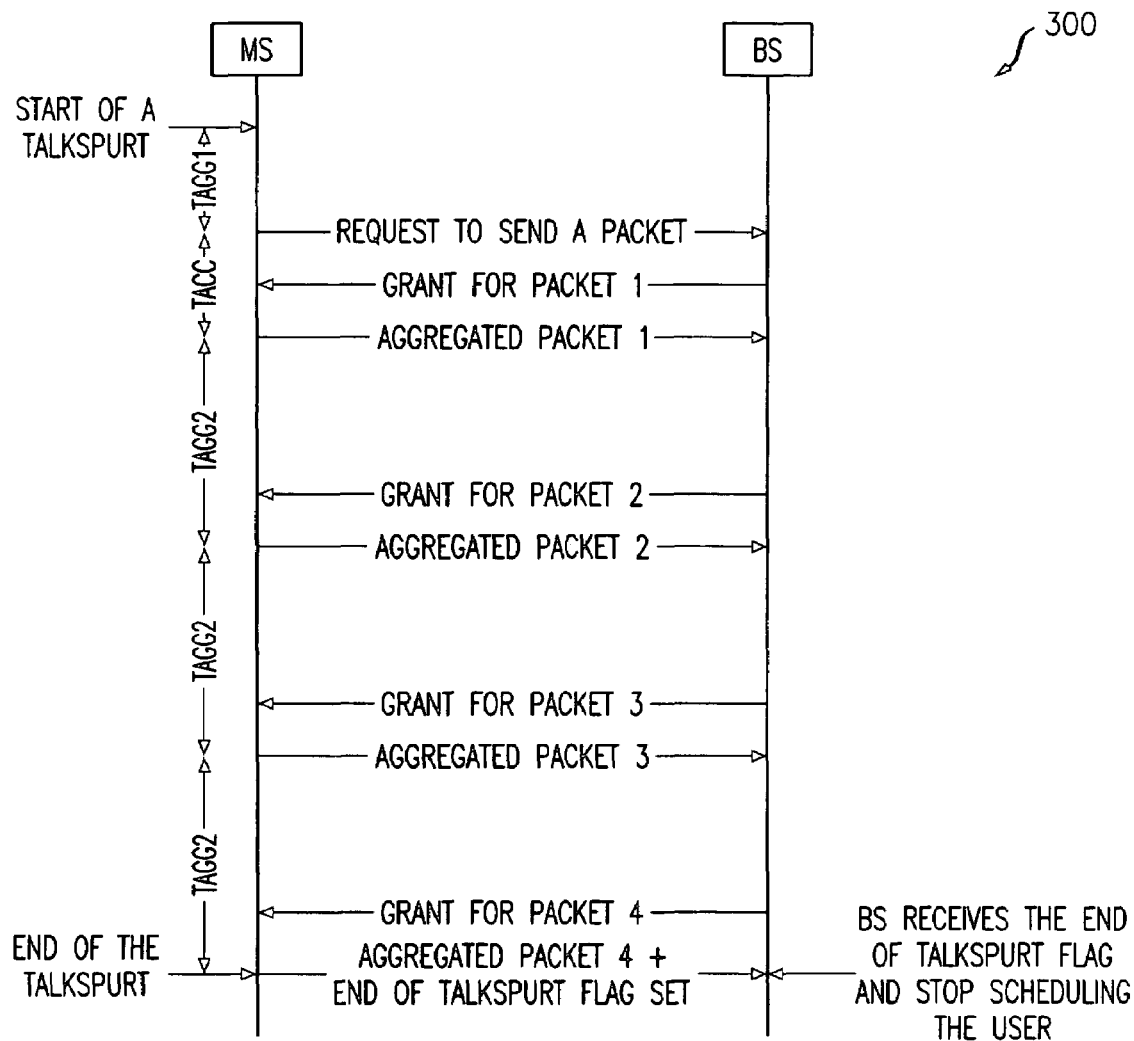
FIG. 5 depicts a signal flow according to another embodiment of the present invention.
Figure 6:
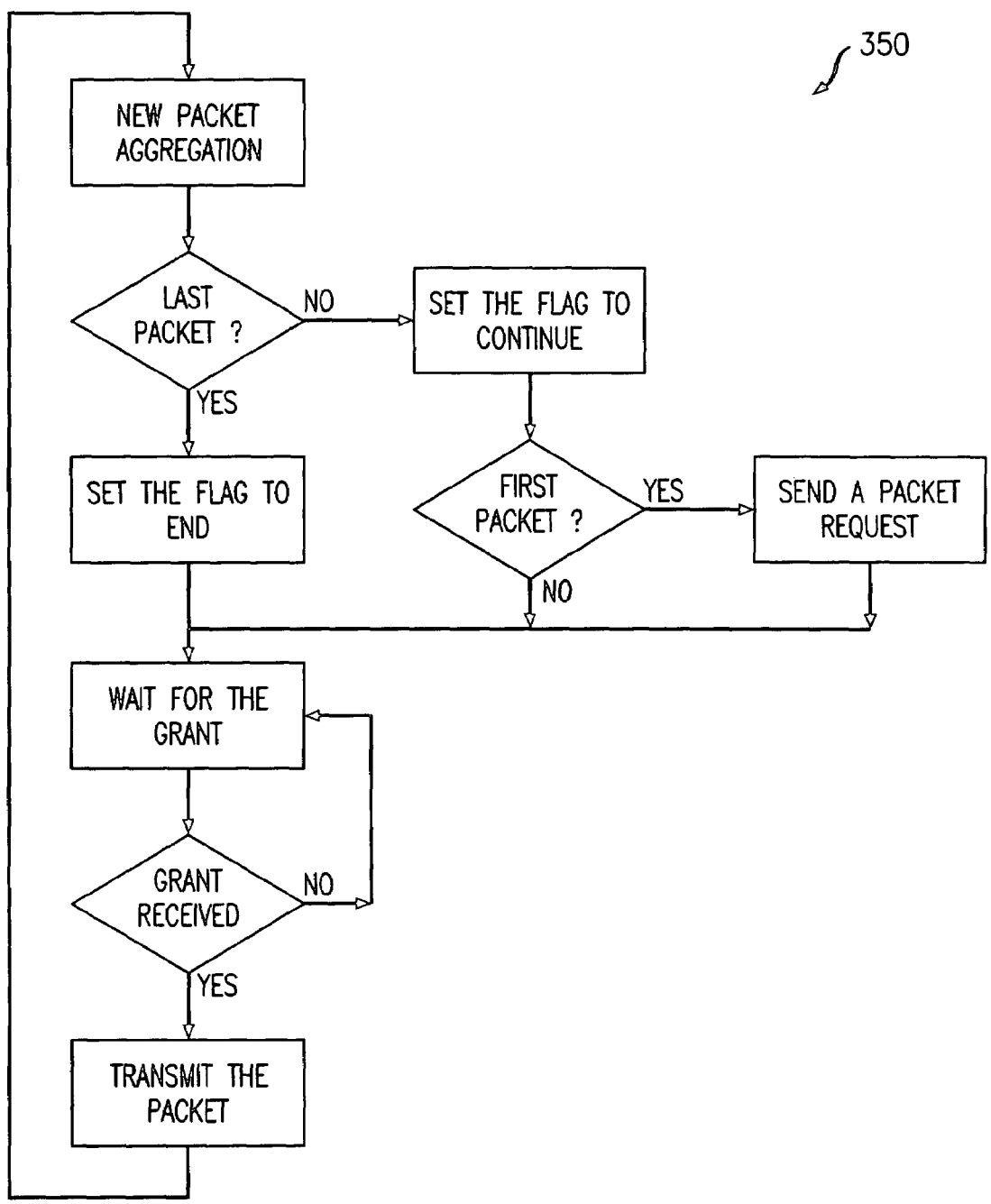
FIG. 6 depicts a flow chart according to the embodiment of FIG. 5.

Referring to FIG. 5, a signal flow chart 300 is shown. Signal flow chart 300 addresses the issue of efficient use of base station resources associated with the aggregation of packets. While a wireless unit switches from an active period to an inactive period over the uplink, presently, the base station will continue to schedule the wireless unit until some determination is made regarding inactivity. The time associated with this determination introduces a delay length. However, by the present embodiment, the delay for a first packet may be made similar to the remaining packets if the first packet is aggregated over a shorter period of time. An example of packet aggregation and transmissions on the uplink of a wireless communication system is shown in FIG. 5.

At the start of an active period (e.g., talk spurt), a wireless unit (e.g., mobile station) may transmit a request to a base station ("BS"). This request may indicate the start of a talk spurt. After receiving the request from the wireless unit, the base station may transmit a packet grant. Packet grants may indicate, for example, that the wireless unit may transmit a packet. In response to the grant, the wireless unit may transmit a first packet of the talk spurt. For transmitting the remaining packets, a wireless unit need not need to send a request.

It should be noted that a 1 or more bit flag may be added to the packet header might be used to indicate to the base station that the talk spurt is continuing. This flag may also indicate that more packets are to follow. However, in the last packet (e.g., "packet#4"), the wireless unit may set the end of talk spurt flag to indicate to the base station that this may be the last packet from the talk spurt and that no more packets are to follow. In this scenario, the base station may stop sending any more grants to the wireless unit.

It should be noted that the access delay—or, in other word, the time to send the request and getting back the grant response—may be introduced to the first packet only (e.g., packet#1). For the remaining packets, base station may send a scheduling grant based on the knowledge of the fixed aggregation period (e.g., Tagg2) that applies to all but the first packet. It also should be apparent that the first packet might need to be aggregated over a smaller number of voice frames (e.g., Tagg1) in order to account for the access delay. To make the delay similar for all the packets, Tagg2 may be set as (Tagg1+Tacc), where Tagg2 if greater than Tagg1. The parameters Tagg1 and Tagg2 may be negotiated between the wireless unit and the network at the start of a voice call, though may also be configured during a call.

Referring to FIG. 5, a flow chart 350 is shown for depicting a method in accordance with the present invention. More particularly, flow chart 350 depicts a method for reducing wasted base station resources in the aggregation of packets. Flow chart 350 is formulated from the perspective of a wireless unit.

As shown, a new packet is first aggregated before a decision is to be made whether the packet is the last packet. If it is the last packet, then a flag is set to END. However, if it is not the last packet, the flag is set to continue and the packet is examined again to determine if it is the first packet. Once examined, if it determined to be the first packet, a packet request is transmitted. If, in the alternative, it is not the first packet, or once the flag is set to END, or after the packet is determined to not be the first packet, flow chart 350 then waits for the grant to be received in a loop. Only once the grant is received, the packet may be transmitted.

In an example of the present embodiment, the method includes the step of communicating (e.g., transmitting and receiving) at least one flag in a physical layer frame formed by an aggregating a number of content frames, each of which may comprise a voice and/or data frame. Here, this step of communicating may be performed if switching between an active period(s) and an inactive period(s), while this flag may be indicative of an end to an active period corresponding with communicating over an uplink and the beginning of the inactive period. At the onset of the active period, an initiation signal(s) may be communicated corresponding with the period. In turn, a scheduling grant(s) may be communicated in response to the communicated initiation signal. Consequently, the active period may correspond with communicating over an uplink. It should be noted that each physical layer frame might also formed by dynamically varying an aggregate packet size of the aggregation of content frames in response to a condition of a channel.

Figure 7:
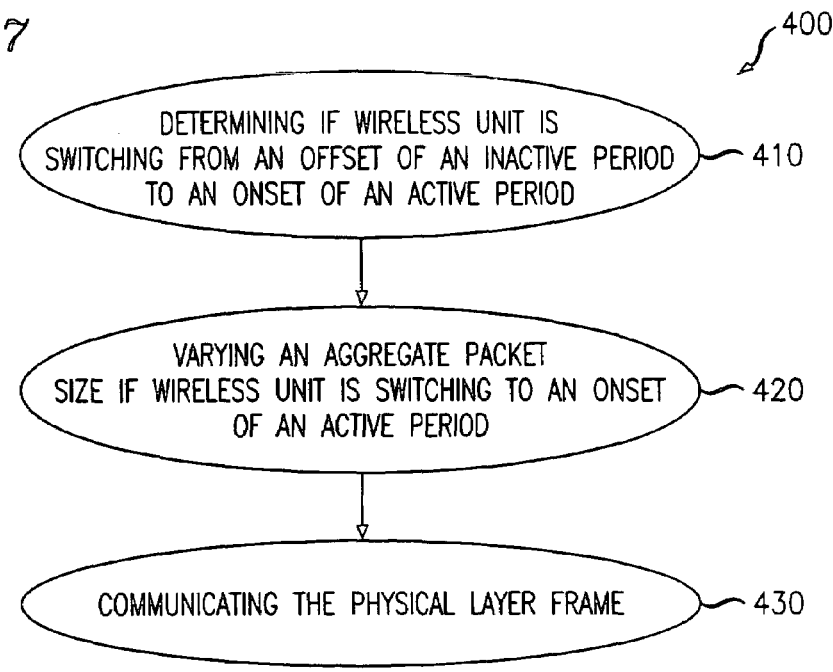
FIG. 7 depicts a flow chart according to yet another embodiment.

Referring to FIG. 7, a flow chart 400 is shown according to yet another embodiment of the present invention. Flow chart 400 corresponds and addresses the issue of a delay created, for example, when a wireless unit switches from an inactive period to an active period corresponding with communicating over an uplink. To date, various access channels (e.g., random access channel and/or enhanced random access channel) are used in such a circumstance to notify the base station of upcoming activity over the uplink. However, using these access channels introduces undesirable delay.

In view of the context of this problem, flow chart 400 addresses the case of variable length packet aggregation. The method embodied in flow chart 400 promotes use of a signaling channel, which is distinct from various access channels (e.g., random access channel and/or enhanced random access channel) to reduce the size of the delay. More particularly, flow chart 400 conveys reducing the size of the first aggregate packet to provide additional headroom for the delay attributable to the signaling channel through which protocols will be exchanged to notify the base station of upcoming an upcoming switch from an inactive period to an active period.

Regarding the process steps of flow chart 400, initially a determination is necessary regarding whether a wireless unit is switching from about an offset of an inactive period to about an onset of an active period (step 410). This determination may be realized by various means, including use of a flag over a signaling channel(s). Moreover, an initiation signal(s) may also be employed to facilitate this determination. In this regard, the initiation signal(s) may correspond with about the onset of the active period and may be communicated. Thereafter, a scheduling grant may be communicated by the base station in response to the receipt of the initiation signal(s).

Once the determination has been completed, an aggregate packet size may be varied if the wireless unit is switching to an onset of an active period (step 420). Varying the aggregate packet size may include modifying a number of content frames to form a physical layer frame(s). Here, each content frame includes a voice frame and/or a data frame.

Subsequently, after the size has been established for the first aggregate packet, the method reflected in flow chart 400 calls for communicating the physical layer frame (step 430). As a consequence of steps detailed herein, a resultant communicated physical layer frame at the onset of the at least one active period may be formed in response to the communicated at least one scheduling grant. More particularly, the communicated physical layer frame at the onset may include fewer content frames relative to the number of content frames for subsequently communicated physical layer frame after the onset.

In an example of the present embodiment, the method includes the step of communicating at least one physical layer frame formed by varying an aggregate packet size. This step may be performed if switching between an active period(s) and an inactive period(s). Moreover, the step of varying an aggregate packet size may include modifying a number of content frames to form the physical layer frame(s), wherein each content frame comprises a voice frame and/or data frame. The step of switching may also correspond with switching from about an offset of the inactive period to about an onset of the active period. The communicated physical layer frame at the onset of the active period may be formed in response to the communication of scheduling grant(s).

Figure 8:
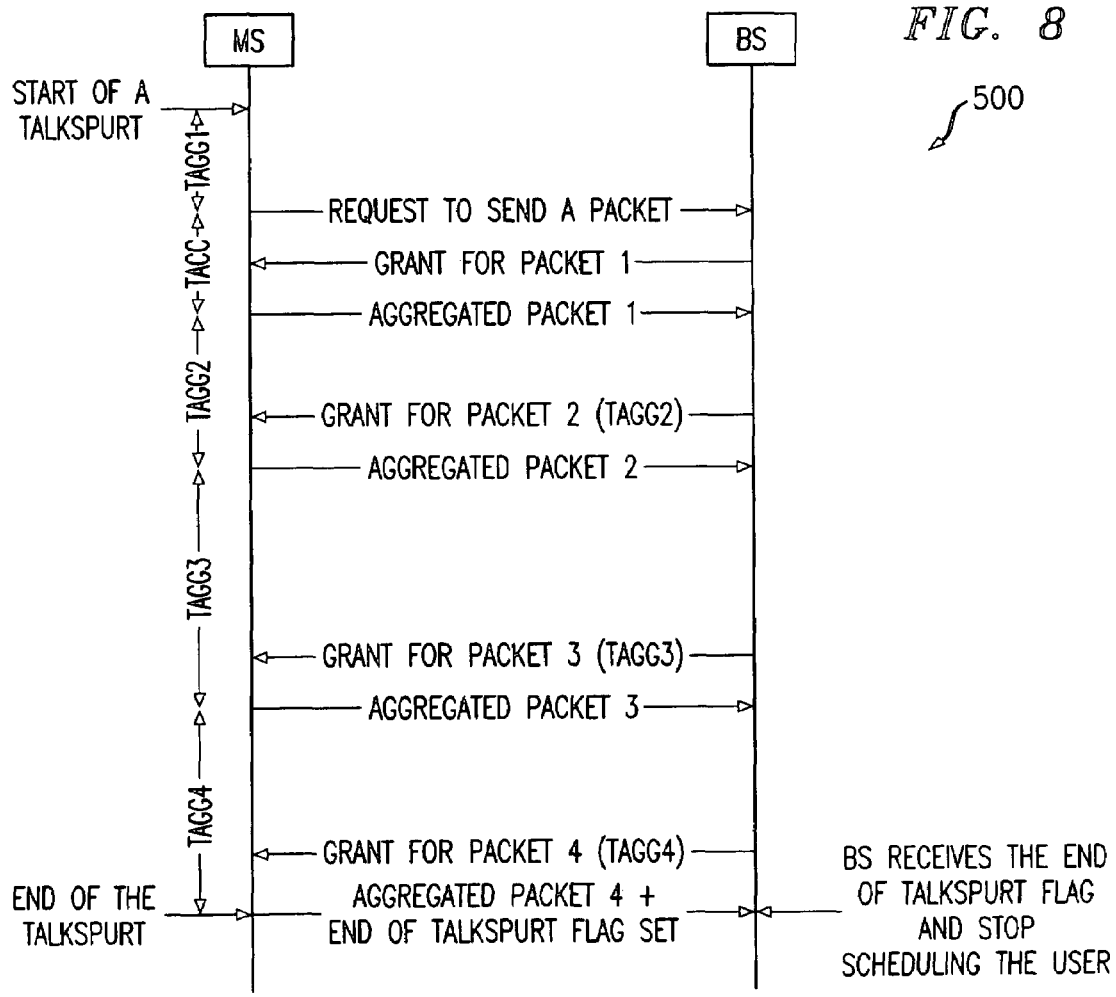
FIG. 8 depicts a signal flow according to still yet another embodiment of the present invention.

Referring to FIG. 8, a signal flow diagram 500 is illustrated according to still yet another embodiment of the present invention. In this case, the aggregation duration is determined based on the information in the grant channel. The base station can determine the aggregation duration based on conditions such as channel quality and the system load, for example. The variable duration frame aggregation may be used to distribute the packet arrival times from different users. For example, if packets arrive from a large number of users at the same time, additional queuing delay may be introduced because the system cannot serve a large number of users at he same time due to limited amount of resources available. However, the packet arrival times can be changed for various users by varying the packet aggregation duration for some or all of the users. A simple way of achieving the goal of distributing users is to change the aggregation duration for the first packet from the active period (e.g., talk spurt).

Figure 9:
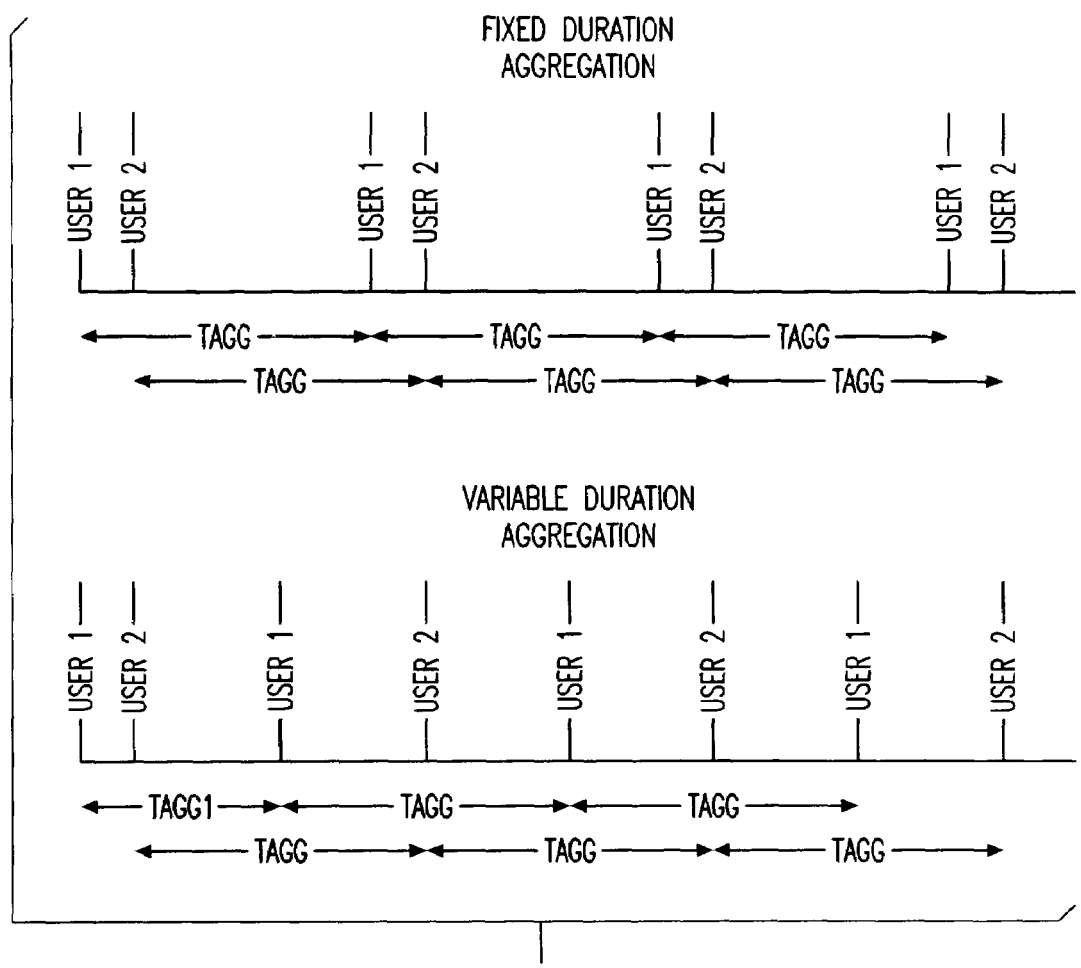
FIG. 9 depicts an aspect of the embodiment of FIG. 8.

Referring to FIG. 9, an exemplary aspect of the embodiment of FIG. 8 is illustrated. Here, an example of variable duration voice packet aggregation used to distribute the packet arrivals from two users is shown. In the fixed duration packet aggregation case, if the packets from two users arrive close to each other, they may continue along until the end of the active period (e.g., talk spurt). However, if the packet aggregation time for the first packet from exemplary user 1 can be changed, the packet arrival times may be spread across time.

In the illustrated example of FIG. 9, the packet from users I may be aggregated over Tagg1, while all the remaining packets arrive Tagg apart. Here, there is no need to make any to the aggregation period for user 2. Consequently, user 2 may use aggregation period of Tagg for all of its packets.

To realize the aim of the present embodiment, the packet aggregation duration in which a number of content frames (e.g., a voice frame and/or a data frame) are aggregated in an active period, corresponding with communicating over an uplink and/or downlink, may be varied. Here, the arrival time of each physical layer frame, formed through varying the aggregate duration, may be modified by changing the packet aggregation duration. Thereafter, the physical layer frame created thereby may be communicated (e.g., transmitted and received). In one example, at least three of the physical layer frames communicated in the packet aggregation duration of an active period are spaced apart in about equal periodic intervals.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center, for example. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method of communication comprising:
communicating at least one physical layer frame, wherein communicating comprises at least one of transmitting the at least one physical layer frame and receiving the at least one physical layer frame, the at least one physical layer frame including content frames formed by:
selecting a portion of a plurality of content frames available for communicating via the at least one physical layer frame, wherein selecting the portion of the plurality of content frames comprises modifying a number of content frames used to form the at least one physical layer frame, and wherein each content frame comprises at least one of a voice frame and a data frame, and wherein the portion is selected based on a condition of a channel for communicating said at least one physical layer frame; and
combining the selected portion of the plurality of content frames with a header formed according to a transmission protocol so that the at least one physical layer frame includes a payload having at least two content frames and at least one Internet Protocol header indicating a source address and a destination address of the physical layer frame.

2. The method of claim 1, comprising at least one of:
receiving a signal comprising information corresponding with the channel condition; and
transmitting the signal comprising the information corresponding with the channel condition.

3. The method of claim 1, wherein communicating is performed over at least one uplink.

* * * * *